March 23, 1954

C. GERST 2,672,769

TRANSMISSION

Filed March 7, 1951

INVENTOR
CHRIS GERST
BY
Gustav A. Wolff
ATT.

March 23, 1954

C. GERST 2,672,769

TRANSMISSION

Filed March 7, 1951

INVENTOR.
CHRIS GERST
BY
*Gustav A. Wolff*
ATT.

Patented Mar. 23, 1954

2,672,769

UNITED STATES PATENT OFFICE 2,672,769

TRANSMISSION

Chris Gerst, Detroit, Mich., assignor, by mesne assignments, to Le Roi Company, Milwaukee, Wis., a corporation of Delaware Application March 7, 1951, Serial No. 214,350

4 Claims. (Cl. 74—788)

This invention relates to power transmission mechanism and, while not limited thereto, has special reference to gearing for vehicles including individual power units and devices driven thereby, as for example road machinery with individual power units and devices driven thereby, such as truck mixers with a power unit for driving and actuating a mixing drum.

The general object of the invention is the provision of an improved power transmission constructed to permit control and reversal of its output shaft by a single reversing transmission of the planetary type, which transmission has its clutch structure positioned adjacent to the main housing of the transmission to simplify assembly and repair operations.

Another object of the invention is the provision of an improved reversible transmission constructed to permit equal reduction of the speed of its output shaft for forward and reverse drive by a single reversing transmission of the planetary type, the transmission having its clutch structure positioned adjacent to the main housing to simplify assembly and repair operations.

A further object of the invention is the provision of an improved reversible torque converter type transmission embodying gearing coupled with a torque converter arranged adjacent to one side of the main housing of the transmission to permit direct coupling of the torque converter with an engine and a reversing transmission of the planetary type constructed to permit forward and reverse drive of the output shaft of the transmission which has the reversing transmission arranged at another side of the main housing to permit direct coupling of such transmission with a device to be driven.

In addition the invention has other marked superiorities which clearly distinguish it from presently known structures. These improvements or superiorities, embodying certain novel features of construction, are clearly set forth in the following specification and the appended claims; and a preferred form of embodiment of the invention is hereinafter shown with reference to the accompanying drawings forming part of the specification.

Figure 1:
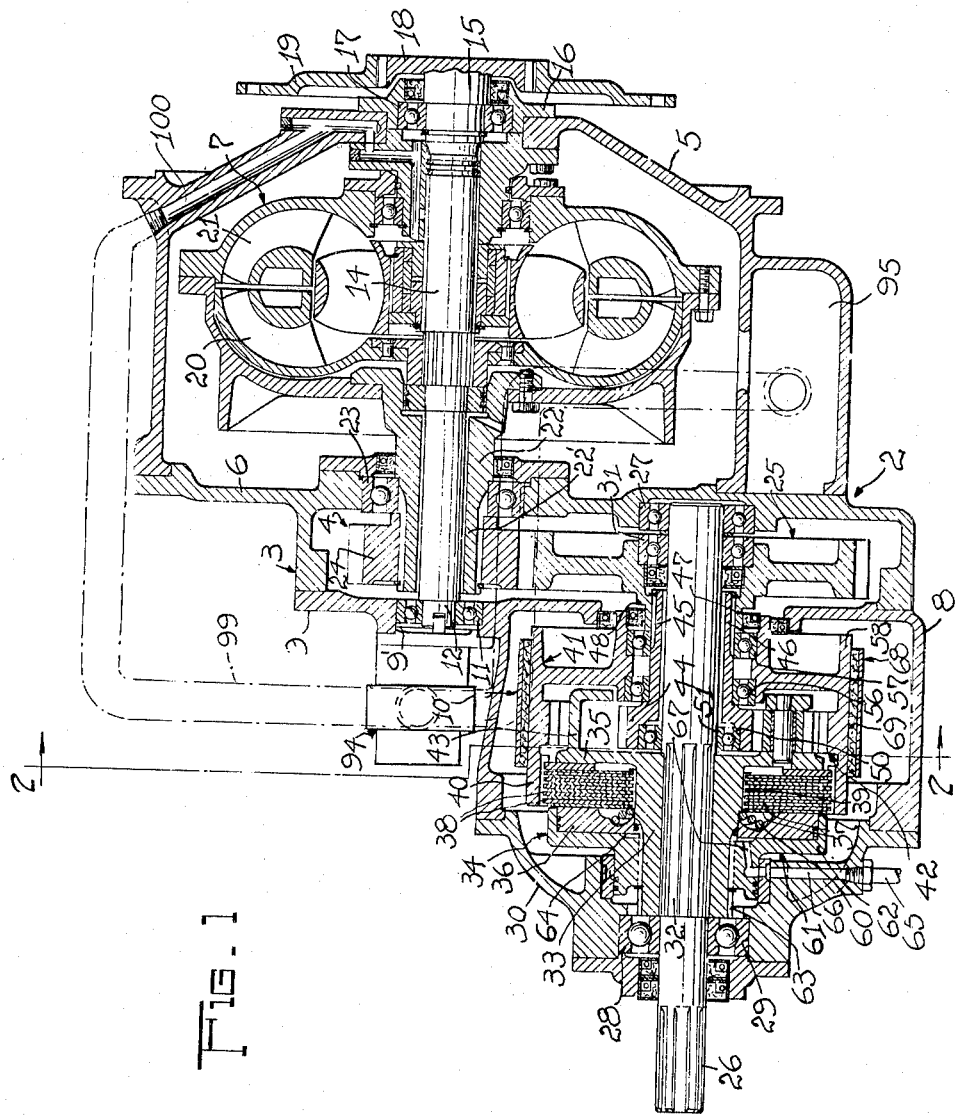
Fig. 1 is a longitudinal sectional view through a reversible, torque converter type transmission constructed in accordance with the invention, the section being taken on line 1—1 of Fig. 2.
Figure 2:
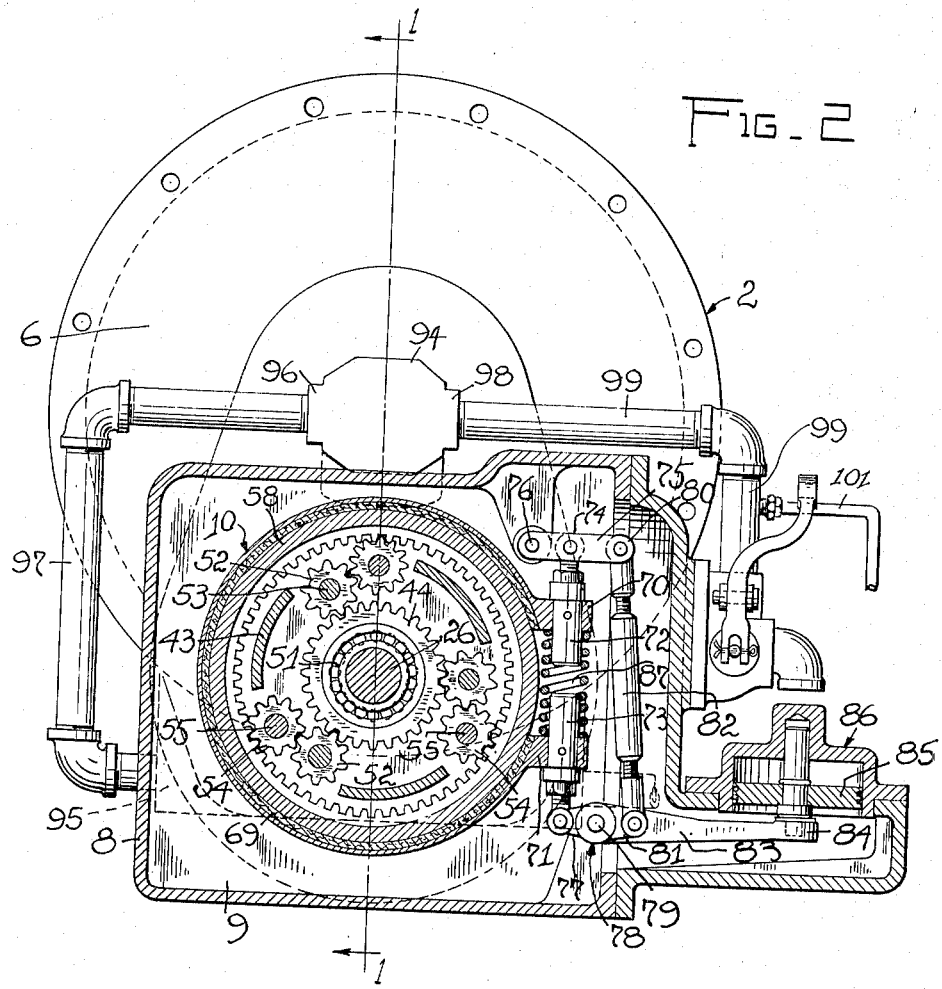
Fig. 2 is a transverse sectional view through the transmission shown in Fig. 1, the section being taken on line 2—2 of said Fig. 1.

Referring now more particularly to the exemplified form of the reversible torque converter type transmission shown in the drawings, reference numeral 2 denotes a composite housing embodying a housing portion 3 mounting a reducing gear drive 4, a torque converter housing portion 5 extended from side wall 6 of housing portion 3 and mounting a torque converter 7, and a clutch housing portion 8 extended from side wall 9 opposite side wall 6 of housing portion 3 and mounting a planetary transmission mechanism 10.

Housing portion 3 rotatably supports in a ball bearing 11 in a bore 9' of side wall 9 the inner end 12 of an input shaft 14 which has its outer end 15 journaled in end wall 16 of torque converter housing portion 5, a ball bearing 17 being used for this purpose. This input shaft which includes a head portion 18 mounting a coupling member 19 adapted to connect such shaft with an engine or motor, is coupled with the converter pump 20 of torque converter 7 including the customary turbine 21 having attached thereto a splined tubular shaft 22 supported by a ball bearing 23 in wall 6 of main housing portion 3. Tubular shaft 22 supports on its splined portion 22' within housing portion 3 a small gear 24 forming one element of reducing gear drive 4, which gear meshes with a large gear 25 forming another element of said reducing gear drive.

The planetary transmission mechanism 10 arranged in clutch housing portion 8 and coupled with the large gear 25 of reducing gear drive 4, includes a driven shaft 26 which is also the output shaft of the power transmission. This driven shaft has its inner end journaled in a ball bearing 27 mounted in side wall 6 of housing portion 3 and is journaled near its other end in ball bearing 28 mounted in a bore 29 in the side wall 30 of clutch housing portion 8. Output shaft 26 rotatably supports large gear 25, a ball bearing 31 being used for this purpose, and mounts on its splined portion 32 a sleeve-like base 33 for a disk clutch 34 which includes a backing plate 35 formed as an integral part of base 33, and a spring-pressed clamping plate 36 cooperating with the backing plate 35 in frictionally coupling two series of friction disks 37 and 38 with each other, which disks are slidably and non-rotatably mounted on a splined portion 39 of base 33 and an internally splined portion 40 of a ring gear 41. The ring gear forms a part of a planetary drive arrangement 42 including a planet gear carrier 43 which is extended from base 33 as an integral part thereof.

Planetary drive arrangement 42 includes a sun gear 44 formed as an integral part of a tubular shaft 45 which has its splined portion 46 coupled with an internally splined tubular end portion 47 of hub 48 on large gear 25. Tubular shaft 45 is recessed at 50 and seats the outer race of a ball bearing 51 having its inner race mounted on output shaft 26, so as to freely rotatably mount shaft 45 on output shaft 26.

Sun gear 44 meshes with a set of three planet gears 52 which are rotatably supported on stud shafts 53 mounted on the planet gear carrier 43. Planet gears 52 mesh with a second set of three planet gears 54 rotatably supported on stud shafts 55 also mounted on planet gear carrier 43. Planet gears 54 mesh with ring gear 41 which is rotatably supported on tubular shaft 45 by ball bearings 56, 57. The ring gear 41 is provided with a circumferential flange 58 partly encircling base 33 of disk clutch 34. Flange 58 which as stated is splined at 39 and slidably and non-rotatably supports the friction disks 38 permits frictional coupling of ring gear 41 with output shaft 26 when clamping plate 36 of clutch structure 34 is shifted against the force of spring 60 toward backing plate 35 for frictional engagement of friction disks 37 and 38 with each other. Such shifting of clamping plate 36 is effected by a cylinder-piston-like arrangement 61 including a cup-shaped member 62 fluid-tightly mounted on the splined portion 63 of base 33, which cup-shaped member slidably supports in its cylinder-like recess 64 the piston-shaped clamping plate 36. A shifting of clamping plate 36 toward backing plate 35 is effected when pressure fluid from fluid pump 94 mounted in front of housing 2 enters through pipe 65 and passages 66 and 67 into the cylinder-like recess 64 of cylinder-piston-like arrangement 61, and shifting of clamping plate 36 in the opposite direction is effected by spring 60 when the pressure fluid in recess 64 is discharged from said recess through passages 67, 66, and a four-way valve structure 88 (later to be described) into a sump 95 acting as a fluid reservoir for pump 94 which draws fluid therefrom through intake pipe 96.

The described power transmission provides a reversible speed reduction drive arrangement between input shaft 14 and output shaft 26. The drive arrangement effects a reduced forward rotation of output shaft 26 when disk clutch 34 is actuated and brake arrangement 68 (later to be described) is inactivated, as then input shaft 14 transfers its rotation through torque converter 7 to gear drive 4, thence through large gear 25 to tubular shaft 45 and sun gear 44, and finally through planet gears 52 and 54 to ring gear 41 which by clutch 34 is coupled with output shaft 26. A reverse rotation of output shaft 26 is effected by the drive arrangement when clutch 34 is released and the referred to brake arrangement 68 is activated. In this latter case planet gears 54 roll on arrested ring gear 41 and by rotation of planet gear carrier 43 and base 33 effect a reverse rotation of output shaft 26.

In the described construction the planetary transmission mechanism controls forward and reverse rotation of the output shaft 26, forward rotation being effected by coupling the ring gear 41 through disk clutch 34 with the output shaft, and reverse rotation being effected by arresting rotation of ring gear 41 and releasing disk clutch 34. In the latter case planet gears 54 roll off on the ring gear and planet gears 52 geared to planet gears 54 and sun gear 44 effect reverse rotation of planet gear carrier 43 therewith reverse rotation of output shaft 26 mounting base 33.

Figure 3:
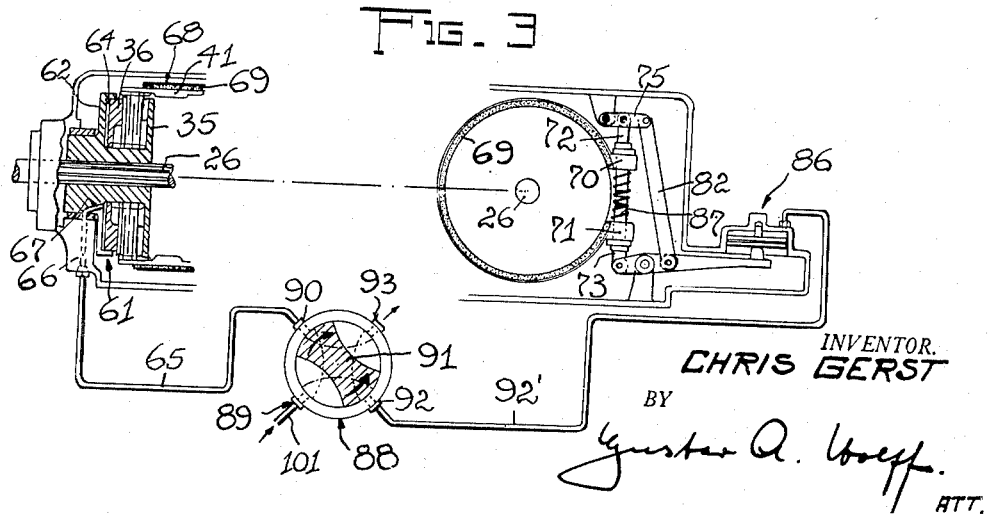
Fig. 3 is a diagrammatic view showing selective pneumatic actuation of the transmission for forward and reverse drive of the output shaft.

The rotation of ring gear 41 is arrested by a brake band 69 encircling flange 58 of the ring gear. This brake band is one of the elements of a brake arrangement 68 connected by fluid control means with the clutch operating, cylinder-piston-like arrangement 61 to eliminate simultaneous actuation of the clutch operating, cylinder-piston-like arrangement 61 and the brake arrangement 68 as clearly disclosed in the diagram of Fig. 3.

The brake band 69 of brake band arrangement 68 supports at its opposite ends 70 and 71 longitudinally adjustable connecting studs 72, 73, stud 72 being connected to the central portion 74 of a lever 75 pivoted on a pin 76 mounted in clutch housing portion 8 and stud 73 being coupled to the arm 77 of a double lever 78 pivoted on pin 79 also mounted in clutch housing portion 8. The levers 75 and 77 are linked to each other for joint operation by a longitudinally adjustable link 82 connecting the end 80 of lever 75 to the arm 81 of double lever 78. Link 82 is, furthermore, pivotally connected to an operating lever 83 pivoted on a pin 79 mounted in housing portion 8, which operating lever 83 has its free end 84 connected with the piston 85 of a cylinder piston arrangement 86 adapted to effect downward movement of lever 83 to tighten the brake band 69 on flange 58 of ring gear 41. In inactive state the cylinder piston arrangement 86 permits opening up of the brake band 69 by a compression spring 87 so as to release the grip of the brake band on flange 58.

The planetary transmission mechanism is actuated by the cylinder-piston arrangements 61 and 86 controlled by the four-way valve structure 88 having an intake 89, a rotary valve 91 and outlet passages 90, 92 and 93. Outlet passage 90 communicates through pipe 65 with cylinder piston arrangement 61, outlet passage 92 communicates through pipe 92' with cylinder piston arrangement 86, and outlet 93 communicates with a fluid sump 95 in housing 2. In order to effect a forward rotation of output shaft 26, valve 91 is rotated to the dotted line position (see Fig. 3), in which position intake 89 communicates through outlet 90 and pipe 65 with cylinder piston arrangement 61 and cylinder piston arrangement 86 communicates through pipe 92' and outlets 92 and 93 with the fluid sump 95. Reverse rotation of output shaft 26 is effected by rotating valve 91 to the dash-dotted line position, in which position intake 89 communicates through outlet 92 and pipe 92' with the cylinder piston arrangement 86, and cylinder piston arrangement 61 communicates through pipe 65, outlets 90 and 93 with fluid sump 95. Rotation of output shaft 26 can readily be stopped when valve 91 is rotated to the full line position in which the valve cuts off supply of pressure fluid to the two cylinder piston arrangements 61 and 86. Fluid for actuation of torque converter 7 and the two cylinder piston arrangements 61 and 86 is supplied from pump 94 coupled with and driven by input shaft 14. This pump has its intake 96 connected by pipe line 97 with sump 95 and its outlet 98 connected by pipe line 99 with the intake passage 100 of torque converter 7. The pipe line 99 has extended therefrom a pipe line 101 coupled with the intake 89 of the four-way valve structure 88 and supplying from pump 94 pressure fluid necessary for the operation of cylinder piston arrangements 61 and 86.

Having thus described my invention, what I claim is:

1. In a transmission a tubular drive shaft, a driven shaft freely rotatably extended through the drive shaft in axial alignment therewith and a reversing transmission of the planetary type coupling the drive shaft with the driven shaft, said reversing transmission including a sun gear at one end of said drive shaft, a ring gear freely rotatably and axially non-shiftably mounted on said drive shaft adjacent to said sun gear, a planet gear carrier rigidly mounted on the driven shaft, sets of cooperating planet gears on said planet gear carrier, friction clutch means mounted on said driven shaft and ring gear adapted to releasably couple the ring gear with the driven shaft, stationary brake means encircling the ring gear and adapted to arrest rotary movement of such ring gear, and hydraulic actuating means for said friction clutch means and said brake means adapted to directly and selectively actuate the friction clutch means and the brake means for selective forward and reverse rotation of the driven shaft.

2. In a transmission a tubular drive shaft, a driven shaft freely rotatably extended through the drive shaft in axial alignment therewith and a reversing transmission of the planetary type coupling the drive shaft with the driven shaft, said reversing transmission including a sun gear mounted on the inner end of the drive shaft, a ring gear freely rotatably and axially non-shiftably mounted on the drive shaft, a planet gear carrier rigidly mounted on the driven shaft, sets of cooperating planet gears mounted on the planet gear carrier and coupling the ring gear with the sun gear, stationary brake means encircling the ring gear adapted to arrest rotation of the ring gear, frictional clutch means adapted to couple the ring gear with the driven shaft, said clutch means including cooperating, shiftably supported clutch disks on the planet gear carrier and the ring gear, said planet gear carrier being formed with a backing-plate-like portion adapted to back-up the said clutch disks when actuated upon, and hydraulic means adapted to selectively, alternately actuate the clutch means and the brake means for selective forward and reverse rotation of the drive shaft, said hydraulic means including a cylinder supported by the planet gear carrier arranged opposite the clutch disk of said clutch means and a piston adapted to engage and shift the clutch disks for actuation of such clutch means.

3. A transmission as described in claim 2, wherein the planet gear carrier embodies a sleeve-like base rigidly mounted on the driven shaft, wherein said base includes at one end a circumferential flange having the sets of cooperating planetary gears extended from the outer face, and wherein said base includes in axially spaced relation with respect to its flange a flanged disk forming the cylinder of the hydraulic means and shiftably supporting the piston thereof.

4. A transmission as described in claim 2, wherein the planet gear carrier embodies a sleeve-like base rigidly mounted on the driven shaft, wherein said base includes at one end a circumferential flange having the sets of cooperating planetary gears extended from the outer face, wherein said base includes in axially spaced relation with respect to its flange a flanged disk forming the cylinder of the hydraulic means and shiftably supporting the piston thereof, and wherein the sleeve-like base supports axially aligned therewith a spring member adapted to yieldingly force said piston into the cylinder of the hydraulic means.

CHRIS GERST.

References Cited in the file of this patent
UNITED STATES PATENTS

| Number | Name | Date |
|---|---|---|
| 1,185,320 | Holmes | May 30, 1916 |
| 1,239,213 | Petrelli | Sept. 4, 1917 |
| 2,149,117 | Dodge | Feb. 28, 1939 |
| 2,182,621 | Dodge | Dec. 5, 1939 |
| 2,348,460 | Fennama et al. | May 9, 1944 |
| 2,371,371 | Watson | Mar. 13, 1945 |
| 2,472,559 | Arnold et al. | June 7, 1949 |
| 2,521,239 | McDowall et al. | Sept. 5, 1950 |